(12) United States Patent
Bormioli

(10) Patent No.: US 7,219,694 B2
(45) Date of Patent: May 22, 2007

(54) PIPE CONNECTOR FOR CRYOGENIC USE

(76) Inventor: Lorenzo Bormioli, Via Carlo Cerato 14, Padua (IT) 35100

( * ) Notice: Subject to any disclaimer, the term of this patent is extended or adjusted under 35 U.S.C. 154(b) by 220 days.

(21) Appl. No.: 10/530,359

(22) PCT Filed: Oct. 15, 2003

(86) PCT No.: PCT/EP03/11424

§ 371 (c)(1), (2), (4) Date: Apr. 6, 2005

(87) PCT Pub. No.: WO2004/036106

PCT Pub. Date: Apr. 29, 2004

(65) Prior Publication Data

US 2006/0130909 A1    Jun. 22, 2006

(30) Foreign Application Priority Data

Oct. 16, 2002  (IT)  .......................... MI2002A2197

(51) Int. Cl.
*F16L 39/00* (2006.01)
*F16L 37/23* (2006.01)

(52) U.S. Cl. .................. 137/614; 62/50.7; 285/47; 285/904

(58) Field of Classification Search ................ 137/614, 137/614.01, 614.06; 285/47, 904; 62/50.7
See application file for complete search history.

(56) References Cited

U.S. PATENT DOCUMENTS 3,865,409 A * 2/1975 Paddington ................... 285/18
4,335,747 A    6/1982 Mitsumoto et al. ......... 137/614
5,253,675 A * 10/1993 Ooshio et al. ......... 137/614.05

FOREIGN PATENT DOCUMENTS

EP    0900967 A2    3/1999
GB    2097884 A    11/1982

\* cited by examiner

*Primary Examiner*—Kevin Lee
(74) *Attorney, Agent, or Firm*—Jacobson Holman PLLC

(57) ABSTRACT

A connector for piping destined to the transfer of fluid at very low temperature, in particular liquefied natural gas is described. The coupling comprises a first and a second length of piping (8, 9) that are provided with respective closing valves (20, 27) and destined to be fastened, respectively, to a piping (2) for the inflow of the fluid and to a piping (6) for the receiving of the fluid. Onto the second length of piping (9) a quick-coupling mechanism (34) is mounted that comprises a circumferential sequence of jaws (36) that are suitable to provide a firm front coupling between terminal flanges (12, 17) of the two lengths of piping (8, 9), and means (35 38) for the driving of the jaws. Each one of said lengths of piping (8, 9) is surrounded by an external coating band (23, 30) that defines with said length of piping a thermally insulating interspace (25, 32). The two coating bands (23, 30) are passed through by respective mechanisms (22, 29) for the transmission of the motion to said closing valves (20, 27) and the coating band (30) of the second length of piping (9) serves as a support for said quick-coupling mechanism (34).

11 Claims, 6 Drawing Sheets

PIPE CONNECTOR FOR CRYOGENIC USE

This is a nationalization of PCT/EP03/011424 filed Oct. 15, 2003 and published in English.

DESCRIPTION

The present invention concerns a pipe connector for cryogenic use, that is destined to the transfer of fluid at very low temperature, in particular liquefied natural gas.

In the equipment for the transfer of fluid oil products from an offshore extraction field (for instance a floating platform) to a ship destined to their transport to the refining location quick-coupling connectors have been used which provide a first and a second length of piping provided with respective closing valves and destined to be fastened, respectively, to the fluid inflow piping and to the fluid receiving piping. On the second length of piping a quick-coupling mechanism is mounted that comprises a circumferential sequence of jaws that are suitable to provide a firm front coupling between the flanged ends of the two lengths of piping and means for the driving of the jaws, for instance made up of a ring that is made rotate around the axis of the second length of piping and connected with the jaws by elastic bars with variable inclination.

Those quick-coupling connectors that are utilised for the coupling of piping destined to the transfer of fluid products at very low temperature, for instance LNG (liquefied natural gas), must have specific requirements.

In such case, in fact, there is a serious thermal problem due to the fact that, while the field for the extraction of the fluid is provided with equipment suitable to keep the fluid inflow piping at very low temperature, a similar equipment is not available on the ship for its transport, so that the piping that receives the fluid at very low temperature is unavoidably at a higher temperature, in short at room temperature.

The different temperature of the two pipings, and consequently of the two lengths of piping of the connector that is connected with them, can thus determine the imperfect joining of the terminal flanges of the two lengths of piping with consequent possible leak of product.

Another problem met with the connection of piping for fluids at very low temperature is due to the back-flow of the gases that are generated by the expansion of the liquefied fluid that is produced inside the tank of the ship as a consequence of the higher temperature of the same tank. Such back-flow must be allowed in coupled pipings, but obviously prevented in separate pipings.

Another problem due to the very low temperature of the fluid being transported concerns the operation of the closing valves of the two lengths of piping of the connector. Current mechanisms for the operation of the two valves in fact tend to jam up because of the intense cold.

An additional problem finally concerns the possibility that, when the connector is open, a water infiltration takes place between the end of the length of piping fastened to the fluid receiving piping and the relative closing valve. At the moment of the coupling of the connector and of the opening of the valve the water thus infiltrated could mix with to the oil product being transported thus worsening its characteristics.

In view of what described above, scope of the present invention is to provide a quick-coupling connector for piping destined to the transfer of fluids at very low temperature, in particular liquefied natural gas, that solves the above-mentioned problems.

According to the invention a connector has thus been provided comprising a first and a second length of piping provided with respective closing valves and destined to be fastened, respectively, to a fluid inflow piping and to a fluid receiving piping and a quick-coupling mechanism mounted onto the second length of piping and comprising a circumferential sequence of jaws that are suitable to provide a firm front coupling between terminal flanges of the two lengths of piping, and means for the driving of the jaws, characterised in that each one of said length of piping is surrounded by an external coating band that defines with said lengths of piping a thermally insulating interspace, the two coating bands being passed through by respective mechanisms for the transmission of the motion to said closing valves and the coating band of the second length of piping serving as a support for said quick-coupling mechanism.

In that way, between the two lengths of piping and the respective coating bands a thermal insulation is provided that allows the fluid at very low temperature to cover the two lengths of piping without thermally influencing the coating bands and the associated coupling and driving mechanisms.

In order to facilitate and to make the coupling between the terminal flanges of the two lengths of piping perfect in the zone for the passage of the fluid at very low temperature it is also provided that the terminal flanges are subdivided into an internal ring and an external ring respectively fastened to an internal duct destined to the inflow of the fluid at very low temperature and to a coaxial external duct destined to the passage of back-flow gas generated by thermal expansion of the fluid at very low temperature in the tank that receives it, and that the internal ring of the terminal flanges of the length of piping fastened to the piping for receiving the fluid at very low temperature is subject to an elastically yielding axial thrust against the corresponding internal ring of the terminal flange of the other length of piping.

In order to allow the back-flow of the gases generated by the expansion of the fluid at very low temperature inside the tank of the ship the external rings of the terminal flanges of the two lengths of piping are provided with a circumferential sequence of double valves that are made up of two axially lined up valves that when the coupling is uncoupled are elastically maintained in closing position whereas when the coupling is coupled they are automatically biased in an opening position from which they can be moved apart upon command for their return to closing position. For instance, a bar projecting from one of the two valves works as a spacer between the two lined up valves in order to force its opening when the terminal flanges of the two lengths of piping abut one against the other, while a small spring-back hydraulic cylinder located on the ship side can be operated in order to move back the ship side valve as compared with the flange that supports it and, therefore increasing the distance between the two valves as compared with the length of the spacer, so as to allow the movement of the two valves to closing position.

In order to make the maneuvering of the closing valves of the two lengths of piping easy the use of cardanic transmissions is also provided between the same valves and their external driving organs.

Finally, in order to prevent the inflow of water when the connector is uncoupled, the length of piping on the ship side is preferably provided with a cover sliding transversally to the axis of the connector between an opening position and a closing position of the inlet mouth of the internal duct of the aforesaid length of piping. Additional movable covers are provided for the closing valves of the duct for the gas back flow.

These and other characteristics of the present invention will be made evident from the following detailed description of an embodiment thereof that is illustrated as a non limiting example in the enclosed drawings, in which.

Figure 1:
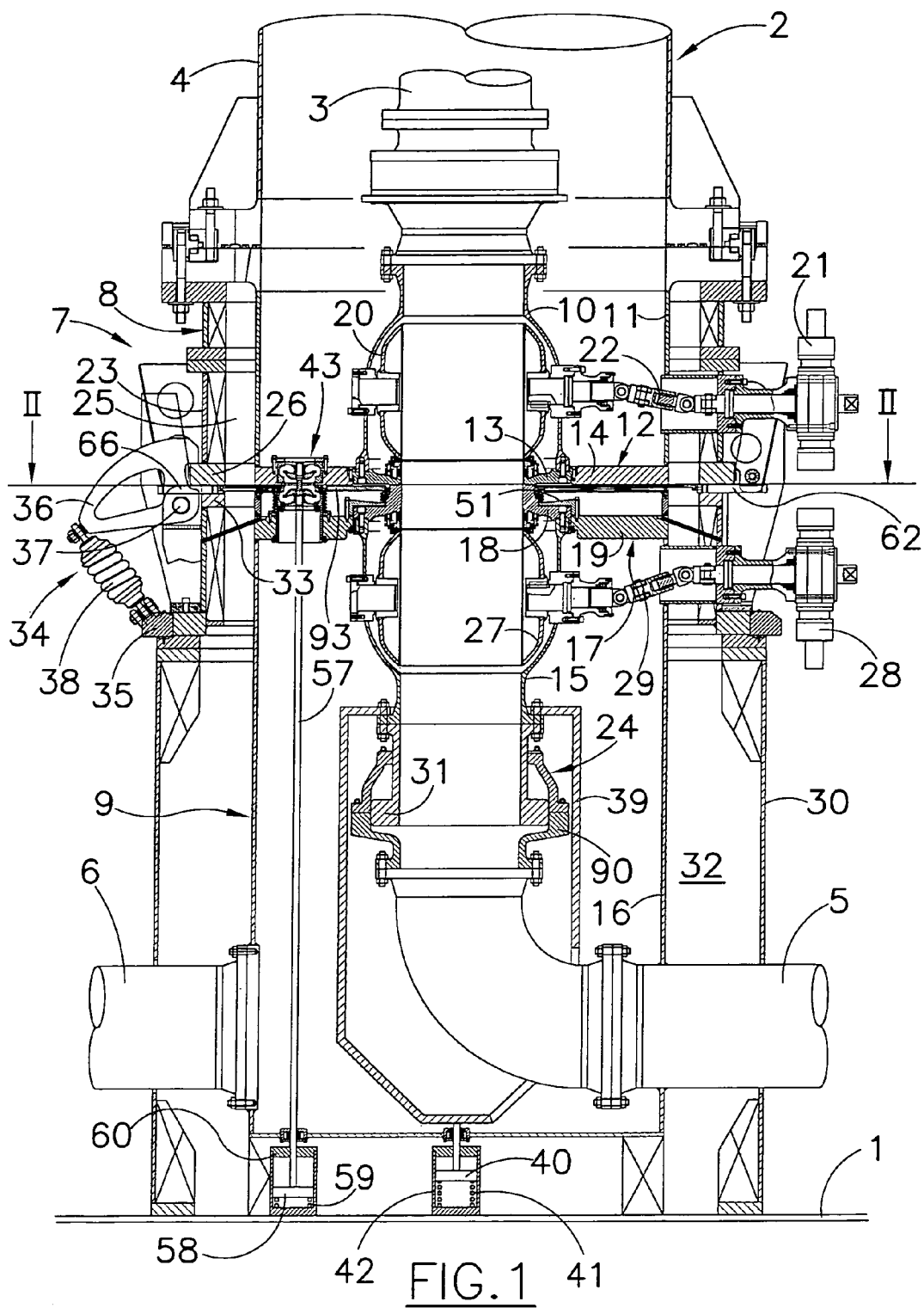
FIG. 1 shows a connector according to the invention in coupled condition, as axially sectioned along the line I—I in FIG. 2.

With reference to FIG. 1, the reference number 1 indicates the platform of a ship, 2 indicates a piping coming from a platform or similar, made up of an internal duct 3 for the inflow of a liquefied fluid product at very low temperature (LNG) and of an external duct 4, coaxial to the internal duct 3 and rigidly fastened to it, for the back-flow of gas to the same platform, 5 indicates a duct that receives the liquefied fluid product from the duct 3 and inputs it into the tank of the ship (not shown), 6 indicates a duct for the back flow of the gas developed by thermal expansion of the liquefied fluid product in the tank of the ship and 7 finally indicates a connector according to the invention.

The connector 7 comprises two lengths of piping 8 and 9, respectively platform side and ship side.

The length of piping 8 is made up of an internal duct 10 fastened to the external liquefied fluid inflow duct 3 and of a coaxial external duct 11 fastened to the gas back-flow external duct 4. The two ducts 10 and 11 are rigidly connected by a terminal flange 12 that is in turn made up of an internal ring 13 fastened to the end of the internal duct 10 and of an external ring 14 fastened to the end of the external duct 11. The two rings 13 and 14 are rigidly fastened to each other so as to define a common flat coupling front for the entire flange 12.

Figure 3:
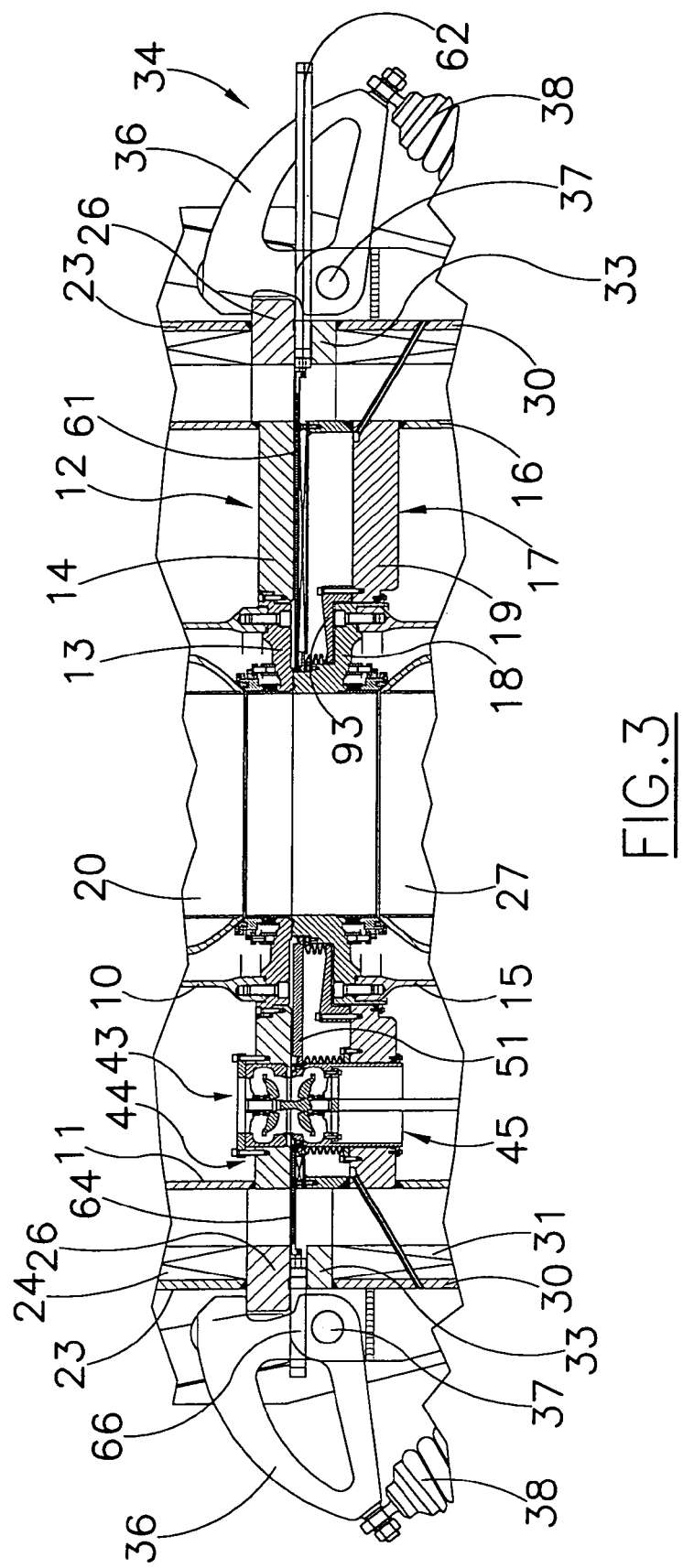
FIG. 3 shows in axial section as in FIG. 1 the magnified detail of the coupling zone of the connector in coupled condition with the double valves which regulate the back-flow of the gases in opening position.

The length of piping 9 is in turn made up of an internal duct 15 to which through an expansion joint 24 (made up of a piston 31 and of a cylinder 90 freely sliding one inside the other) the duct 5 for the receiving of the liquefied fluid product is fastened and of an external coaxial duct 16 that is fastened to the platform 1 of the ship and from which the duct for the back-flow of gas 6 extends externally. The two ducts 15 and 16 are connected with each other by a terminal flange 17 that is in turn made up of an internal ring 18 fastened to the end of the internal duct 15 and of an external ring 19 fastened to the end of the external duct 16 and coupled to the internal ring 18 in axially sliding way. To the external ring 19 of the flange 17 an annular plate 51 is superimposed and rigidly fastened that is destined to abut, when the connector 7 is coupled, against the flange 12 of the length of piping 8 (FIG. 3).

The internal duct 10 of the length of piping 8 is provided with a closing valve 20, that is controllable by an external driving organ 21 through a cardanic transmission 22 that passes through both the internal duct 10 and the external duct 11.

Around the length of piping 8 a coating band 23 is arranged and rigidly fastened to the same length of piping, that forms with the external duct 11 an air interspace 25. The cardanic transmission 22 passes also through the coating band 23, thus leaving the driving organ 21 outside of it. The terminal flanges 12 has in turn an external annular extension 26, that radially projects out of the coating band 23.

The internal duct 15 of the length of piping 9 is in turn provided with a closing valve 27, that is controllable by an external driving organ 28 through a cardanic transmission 29 that passes through both the internal duct 15 and the external duct 16.

Around the length of piping 9 a coating band 30 is arranged and rigidly fastened to the length of the same piping, that is fastened to the platform 1 and that forms with the external duct 16 an air interspace 32. The cardanic transmission 29 passes also through the coating band 30, thus leaving the driving organ 28 outside of it. The terminal flange 17 has in turn an external annular extension 33, than radially projects out of the coating band 30.

The coating band 30 serves also as a support for a quick-coupling mechanism 34, that is made up of a revolving ring 35 opportunely set in action with means that are not shown, a circumferential sequence of jaws 36 (only one shown in FIG. 1) that are movable in radial planes owing to cylindrical pins 37 carried by the external extension 33 of the flange 17 and contoured in such a way so as to hold and to lock the external extension 26 of the flange 12 against the one of the flange 17 when the same jaws 36 are set in the closing position of FIG. 1, and a corresponding sequence of elastic bars 38 hinged at their ends with the revolving ring 35 and with respective jaws 36 so as to vary their lie plane and, by inclining itself more or less, to determine the rotation of the jaws in the opening and closing positions as a function of the rotation of the revolving ring 35. A mechanism of this type is described more in detail in U.S. Pat. No. 3,558,161 in the name of Giorgio Bormioli.

To the internal duct 15 of the length of piping 9, more precisely in the zone in which the receiving duct 5 is fastened, a box-like body 39 is also fastened which is biased in axial direction toward the length of piping 8 by a piston 40 thrust by a spring 41 into a cylinder 42 fastened to the platform 1 of the ship. The stress is such that, when the connector 7 is coupled, a central neck 94 of the internal ring 18 of the flange 17 gets in abutment against the internal ring 13 of the flange 12 (FIG. 3).

Figure 5:
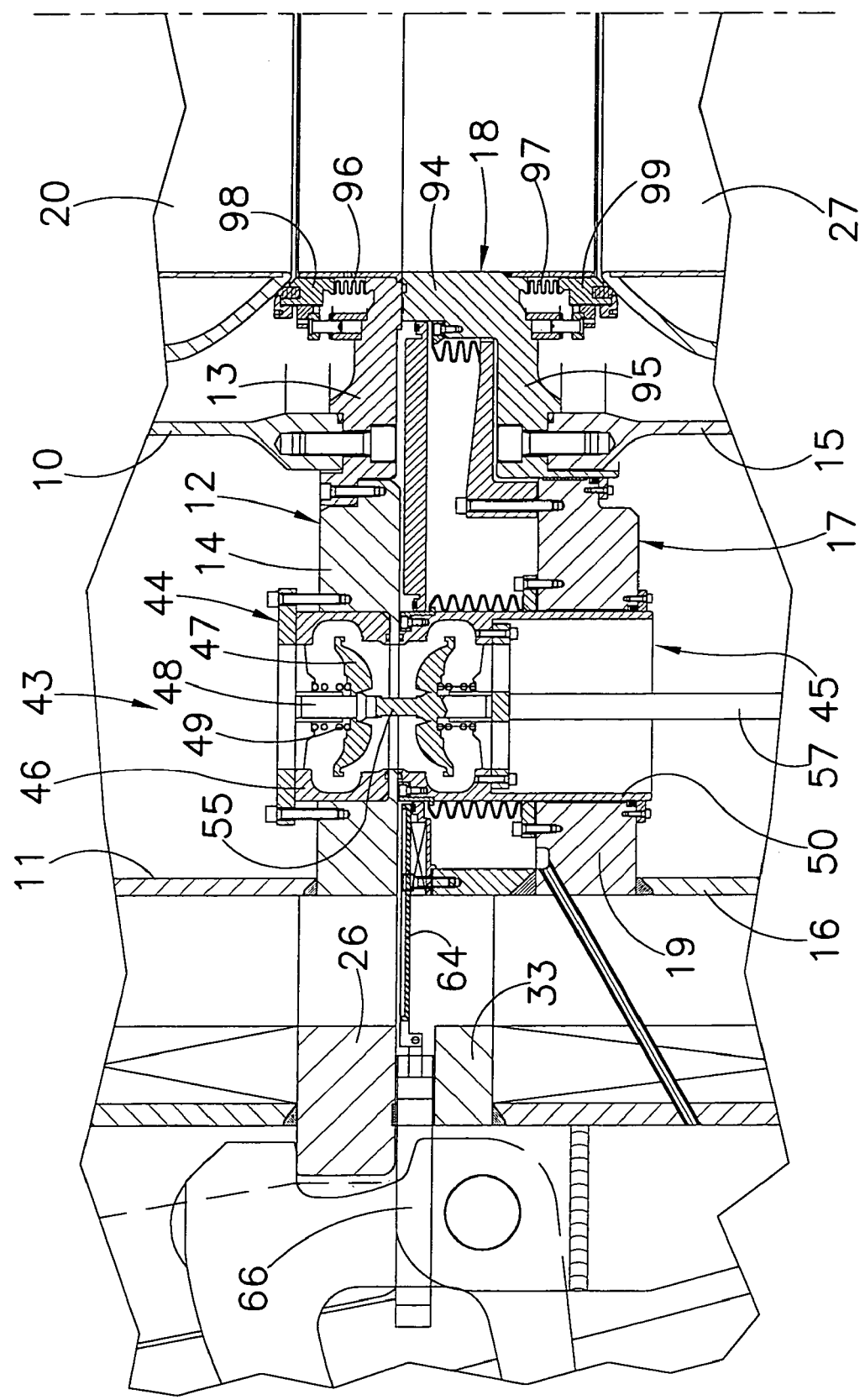
FIG. 5 shows the magnified detail of one of the double valves in the opening position of FIG. 3.

Along the circumference of the external rings 14 and 18 of the flanges 12 and 17 a sequence of double valves 43 (only one shown in FIG. 1) is distributed, each one of which, as best shown in FIGS. 3 and 5, is made up of one first valve 44 carried by the flange 12 and of a second valve 45 carried by the flange 17 and axially lined up with the first one.

The valve 44 has a valve body 46 fastened to the flange 12 and a plug 47 slidingly mounted onto a stem 48 and biased into closing position by a spring 49. The valve 45 has in turn a valve body 50 slidingly housed in one housing of the flange 17 and a plug 52 slidingly mounted onto a stem 53 and biased into closing position by a spring 54. A spacing bar 55 is located as an axial extension of the stem 53 of the valve 45 on the side facing the valve 44 in order to maintain the plug 47 of the valve 44 and also the plug 52 of the valve 45 in opening position when the connector is in coupled condition (FIGS. 3 and 5). In addition from the stem 53 in opposite sense to the bar 55, integrally with the valve body 50, a bar 57 extends that projects up to a piston 58 that is thrust by a spring 59 inside a fluid-dynamic cylinder 60 fastened to the platform 1.

Figure 6:
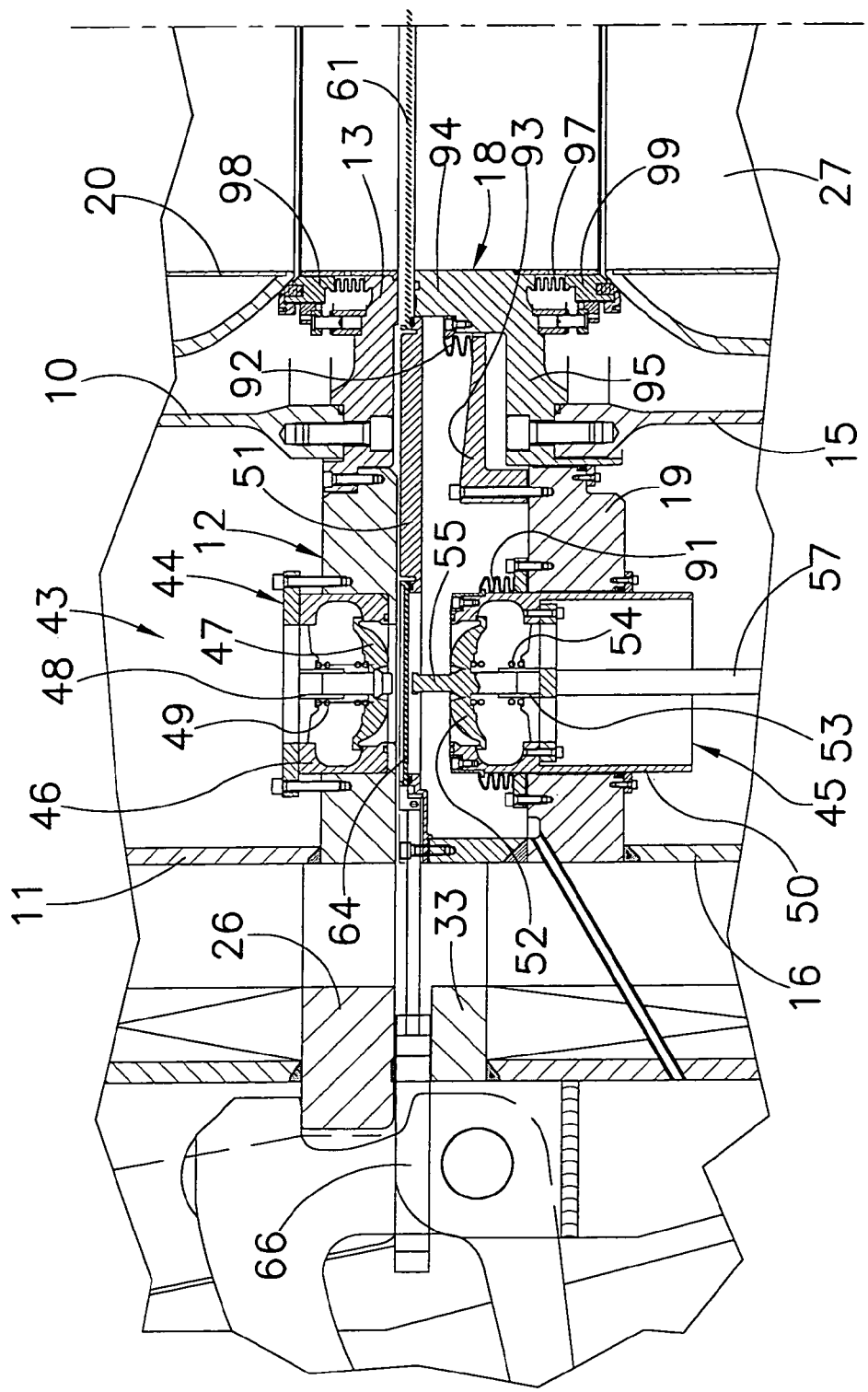
FIG. 6 shows the same magnified detail as FIG. 5 with the double valve in the closing position of FIG. 4.

Elastic bellows 91 are arranged around the valve body 50 with their ends fastened to the external ring 19 of the flange 17 and to the same valve body 50 (FIGS. 5 and 6).

Other elastic bellows 92 are arranged around the central neck 94 of the internal ring 18 of the flange 17 with their ends the fastened to the same central neck 94 and to a small plate 93 fastened to the external ring 19 of the flange 17 and overhanging a side portion 95 of the internal ring 18 of the flange 17 (FIGS. 5 and 6).

Additional elastic bellows 96 and 97 are finally interposed between the internal rings 13 and 18 of the flanges 12 and 17 and axially sliding tightening rings 98 and 99 biased in abutment against the valves 20 and 27, respectively.

When the connector is uncoupled the two main valves 20 and 27 are in closing position, as also the two valves 44 and 45 of the double valves 43. In fact in such situation the spacing bar 55 has not any effect on the plugs 47 and 52, which are subject only to the action of the respective springs 49 and 54.

When the connector is coupled the two flanges 12 and 17 are locked in tight front contact by the jaws 26 of the quick-coupling mechanism 34 (position of FIGS. 1 and 3) and the valves 44 and 45 of all the double valves 43 are automatically opened due to the effect of the action of the spacing bar 55, as shown in FIGS. 1, 3 and 5. The piston 40, thrust by the spring 41, biases the central neck 94 of the internal ring 18 of the flange 17 into tight front contact with the corresponding internal ring 13 of the flange 12 thus assuring the watertightness of the coupling between the internal ducts 10 and 15. To the obtainment of such watertightness the elastic bellows 91, 92, 96 and 97 collaborate. In particular the elastic bellows 91 and 92 prevent infiltrations of water and humidity that otherwise can determine formation of ice that could lock the opening and closing mechanism of all the valves, while at the same time allowing limited axial movements of the two rings 18, 19 of the flange 17.

At that point the main valves 20 and 27 can be opened in order to transfer the liquefied fluids at very low temperature from the platform to the tank of the ship. The gas developed by thermal expansion inside the tank flows back to the platform through the flow-back gas duct 6, the external ducts 11 and 16 of the two lengths of piping 8 and 9 of the connector and finally the external duct 4 of the piping 2.

The very low temperature of the liquefied fluid does not involve problems for the driving organs of the main valves and for the quick-coupling mechanism owing to the presence of the coating bands 23 and 30 and of the respective air interspaces, which create a thermal insulation between the ducts 10 and 15 and the external atmosphere at room temperature. The watertightness of the coupling between the internal rings of the flanges 12 and 17, where it is easier that losses of contact due to the difference in temperature between inside and outside take place, is assured as already said by the thrust of the spring 41. The expansion joint 24 is made in such a way so as to assure at such stage a thrust upward equal and opposite to the separation force of the flanges 13 and 18 exerted by the pressure of the fluid in transfer stage. The possibility to set in action the main valves 20 and 27 is finally guaranteed by the cardanic transmissions 22 and 29.

Figure 4:
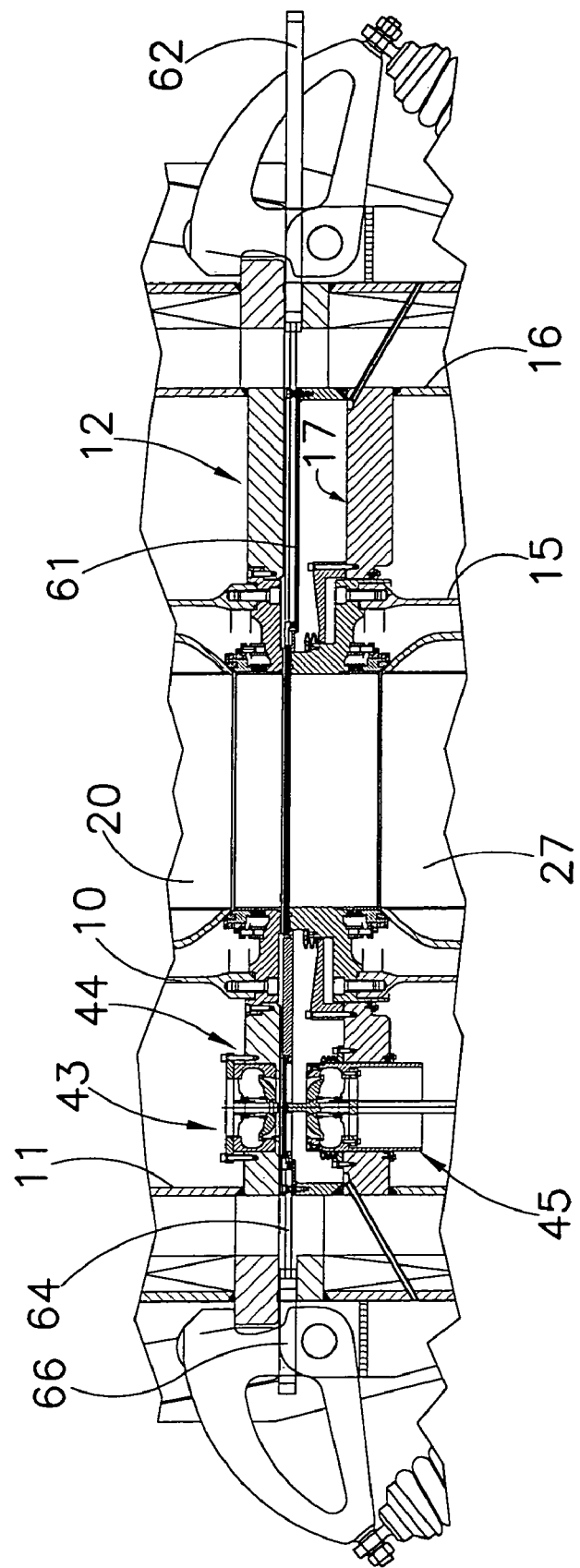
FIG. 4 shows the same magnified detail of FIG. 3, still with the connector in coupled condition but with the double valves in closing position.

Once the transfer has been carried out, in the first place the main valves 20 and 27 get closed. Then the fluid is input into the cylinder 60 above the piston 58 in order to allow the latter to overcome the action of the spring 59 and therefore to determine the descent of the bar 57 and the consequent closing of the valves 44 and 45, that are not withheld by the bar 55 any more (FIGS. 4 and 6). Finally the quick-coupling mechanism 34 can be set in action for the opening of the jaws 36 and the consequent uncoupling of the connector for the release of the two lengths of piping 8 and 9.

Figure 2:
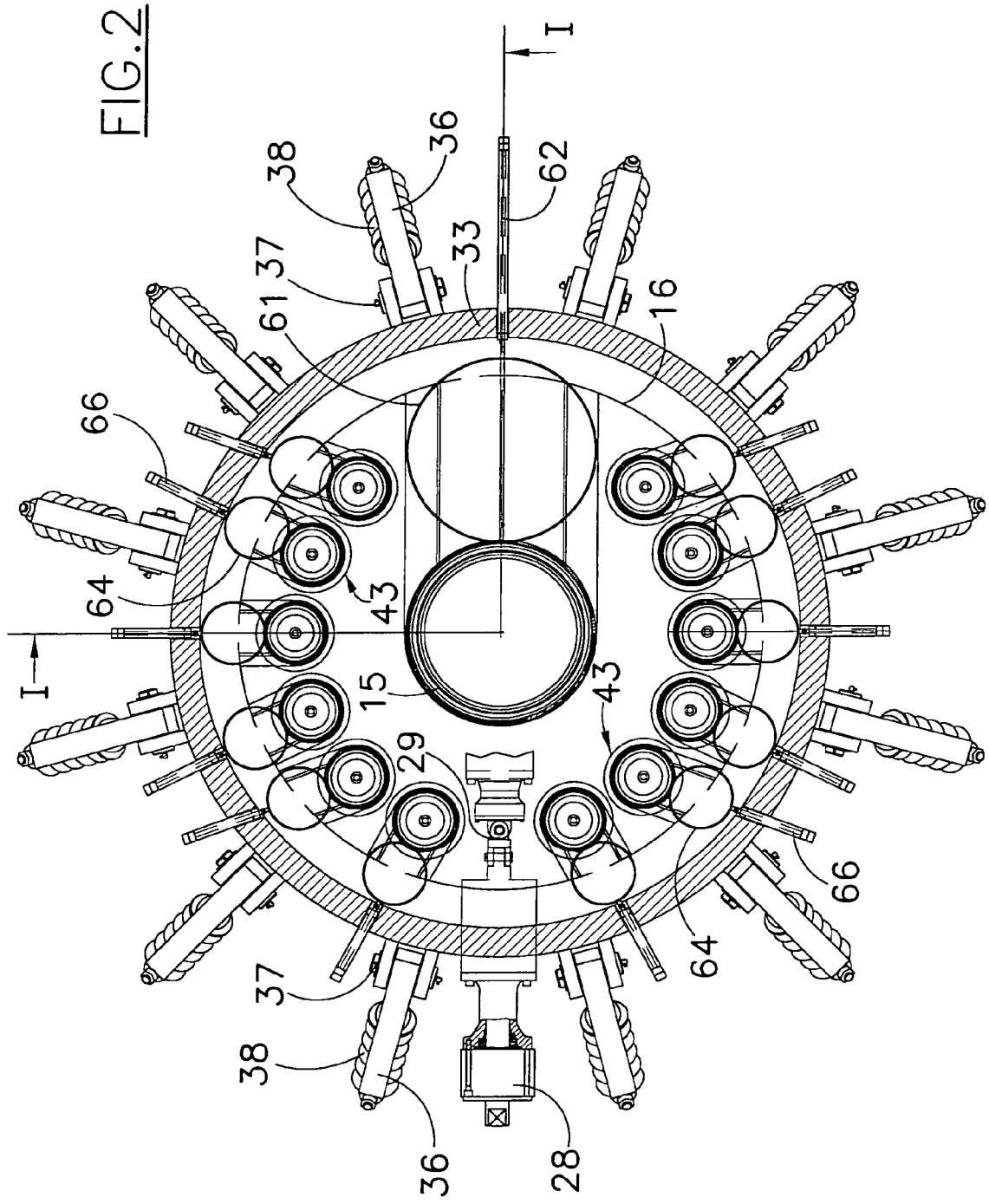
FIG. 2 shows said connector in transversal section according to the line II—II in FIG. 1.

Just before the uncoupling, a cover 61 can be made slide by a driving organ 62 transversally to the axis of the connector 7 from the opening position of FIGS. 2 and 3 to an overlapping and closing position of the internal duct 15 of the length of piping 9 (FIG. 4). Such sliding is allowed by a small axial regression of the internal ring 18 of the flange 17 as regards the external ring 19 of the same flange 17, that is obtained by means of input of fluid above the piston 40 of the cylinder 42.

Similarly, covers 64 can be made slide by respective fluid-dynamic cylinders 66 transversally to the axis of the connector 7 from the opening position of FIGS. 2 and 3 to the closing one of FIG. 4, in which the aforesaid covers 64 are overlapping the respective valves 45 for their watertight closing.

The invention claimed is:

1. Connector for piping destined to the transfer of fluid at very low temperature, in particular liquefied natural gas, comprising a first and a second length of piping (8, 9) provided with respective closing valves (20, 27) and destined to be fastened, respectively, to a piping (2) for the inflow of the fluid and to a piping (6) for the receiving of the fluid and a quick-coupling mechanism (34) mounted onto the second length of piping (9) and comprising a circumferential sequence of jaws (36) that are suitable to provide a firm front coupling between terminal flanges (12, 17) of the two lengths of piping (8, 9), and means (35 38) for the driving of the jaws, characterised in that each one of said lengths of piping (8, 9) is surrounded by an external coating band (23, 30) that defines with said lengths of piping a thermally insulating interspace (25, 32), the two coating bands (23, 30) being passed through by respective mechanisms (22, 29) for the transmission of the motion to said closing valves (20, 27) and the coating band (30) of the second length of piping (9) serving as a support for said quick-coupling mechanism (34).

2. Connector according to claim 1, characterised in that said terminal flanges (12, 17) are subdivided into an internal ring (13, 18) and into an external ring (14, 19) that are respectively fastened to an internal duct (10, 15) destined to the inflow of the fluid at very low temperature and to an external coaxial ducts (11, 16) destined to the passage of flow-back gas generated by thermal expansion of said fluid at very low temperature into the tank that receives it, and that the internal ring (18) of the terminal flange (12) of said length of piping (9) is subject to an elastically yielding axial thrust against the corresponding internal ring (13) of the terminal flange (12) of the other length of piping (8).

3. Connector according to claim 2, characterised in that said axial thrust is provided by a piston (40) housed inside a cylinder (42) and biased by a spring (41).

4. Connector according to claim 2, characterised in that the external rings (14, 19) of the terminal flanges (12, 17) of the two lengths of piping (8, 9) are provided with a circumferential sequence of double valves (43) made up of two axially lined up valves (44, 45) that when the connector is uncoupled are elastically maintained in closing position whereas when the connector is coupled they are automatically biased into an opening position from which they can be moved apart upon command for their return to closing position.

5. Connector according to claim 4, characterised in that one (45) of said two lined up valves (44, 45) is provided with a spacing bar (55) that is suitable to operate on the two lined up valves (44, 45) in order to force their opening when the terminal flanges (12, 17) of the two lengths of piping (8, 9) abut one against the other.

6. Connector according to claim 5, characterised in that it comprises a fluid-dynamic cylinder (60) with elastic return that can be activated so as to withdraw said valve (45) as regards the flange (17) that supports it, in such way so as to determine a distance between the two valves (44, 45) greater than the length of said spacing bar (55) and therefore to allow the movement of the two valves (44, 45) in closing position.

7. Connector according to claim 2, characterised in that said mechanisms (22, 29) for the transmission of the motion to said closing valves (20, 27) are made up of cardanic transmissions that are interposed between said closing valves (20, 27) and respective external driving organs (21, 28).

8. Connector according to claim 1, characterised in that said second length of piping (9) is provided with a cover (61) that is movable transversally to the axis of the connector (7) between an opening position and a closing position of the input mouth of the internal duct (15) of the aforesaid length of piping.

9. Connector according to claim 8, characterised in that said second length of piping (9) is provided with additional covers (64) that are movable transversally to the axis of the connector (7) between an opening position and a closing position of respective valves (45) of said double valves (43).

10. Connector according to claim 2, characterised in that the internal duct (15) of the second length of piping (9) is connected with a duct (5) for the receiving of the fluid through an expansion joint (24) that allows to exert onto said internal duct (15) an axial thrust equal and opposite to the separation thrust that is exerted onto the internal ring (18) of the terminal flange (17) of the second length of piping (9) by the fluid during the transfer stage.

11. Connector according to claim 2, characterised in that it comprises elastic bellows (91, 92) associated with said rings (18, 19) of the terminal flange (17) of the second length of piping (9) in order to prevent infiltrations of water and humidity inside the second length of piping (9) when the connector is coupled, while at the same time allowing limited axial movements of the aforesaid rings (18, 19).

* * * * *